(12) United States Patent
Fischer et al.

(10) Patent No.: US 6,291,917 B1
(45) Date of Patent: Sep. 18, 2001

(54) ELECTRICAL DRIVE UNIT

(75) Inventors: Ernst Fischer, Gernsbach; Richard Hurst, Offenburg, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/254,069

(22) PCT Filed: May 13, 1998

(86) PCT No.: PCT/DE98/01322

§ 371 Date: Dec. 14, 1999

§ 102(e) Date: Dec. 14, 1999

(87) PCT Pub. No.: WO99/00277

PCT Pub. Date: Jan. 7, 1999

(30) Foreign Application Priority Data

Jun. 26, 1997 (DE) ............................................. 197 27 119

(51) Int. Cl.[7] ...................................................... H02K 7/10
(52) U.S. Cl. ............................ 310/99; 310/75 A; 310/98; 310/96
(58) Field of Search ................................. 310/99, 98, 96, 310/75 A, 75 P, 75 R

(56) References Cited

U.S. PATENT DOCUMENTS

| | | | |
|---|---|---|---|
| 4,369,387 | * | 1/1983 | Haar et al. ............................. 310/83 |
| 5,386,165 | * | 1/1995 | Bruhn .................................. 310/75 R |
| 5,945,755 | * | 8/1999 | Ohmi et al. ......................... 310/75 R |
| 6,018,223 | * | 1/2000 | Oruganty .............................. 318/10 |

* cited by examiner

Primary Examiner—Nicholas Ponomarenko
Assistant Examiner—Thanh Lam
(74) Attorney, Agent, or Firm—Ronald E. Greigg; Edwin E. Greigg

(57) ABSTRACT

An electric drive unit for windshield washers of a motor vehicle, including a drive motor having an armature accommodated in a substantially cup-shaped pole housing, a substantially cup-shaped gearbox, secured by its face end to the pole housing, for receiving at least one transmission gear wheel that meshes with a worm connected to an armature shaft of the armature. The armature shaft has a mushroom-shaped stop face on its face end, against which a spring for generating a defined initial stress comes to rest. The spring is a curved bendable spring, which has a substantially V-shaped profile, with a tensioning plate secured in the gearbox and with a leg that yields in the axial direction of the armature shaft, which in the installed state of rest, the spring exerts a spring force, on the mushroom-shaped face of the armature shaft.

8 Claims, 4 Drawing Sheets

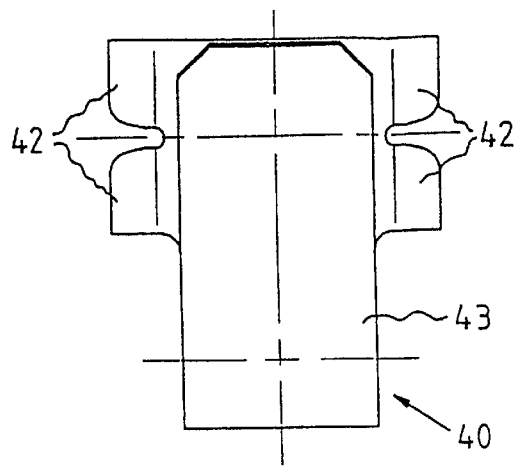
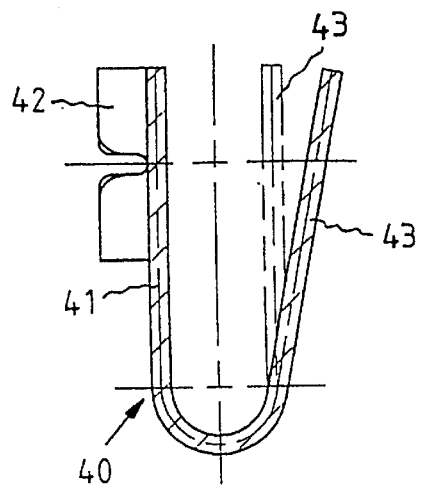
Fig. 4a        Fig. 4b
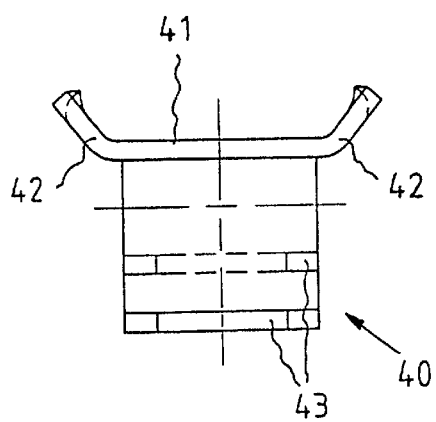
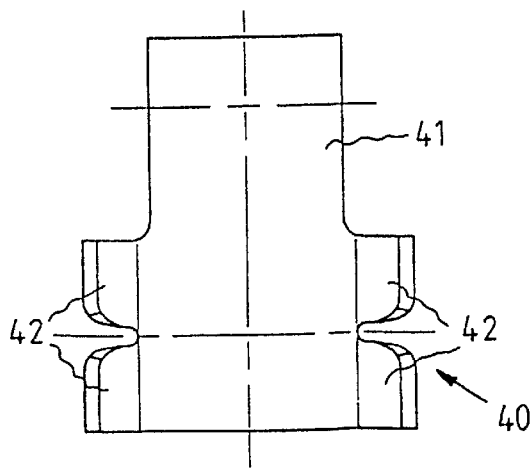
Fig. 4c        Fig. 4d

__

ELECTRICAL DRIVE UNIT

PRIOR ART

The invention relates to an electric drive unit for windshield washers of a motor vehicle, including a drive motor having an armature accommodated in a substantially cup-shaped pole housing. A substantially cup-shaped gearbox is secured by its face end to the pole housing, for receiving at least one transmission gear wheel that meshes with a worm connected to an armature shaft of the armature. The armature shaft has a mushroom-shaped stop face on its face end, against which a spring for generating a defined initial stress comes to rest.

In such drive mechanisms, the armature shaft of the wiper motor must not have any axial play, because otherwise the entire drive mechanism is subject to considerable wear, and in particular irritating knocking noises occur.

One such drive unit is disclosed for instance in German Patent Application DE 195 08 306 A1.

In this drive unit, the axial play is eliminated by a prestressed leaf-springlike spring element, requires only a few steps in assembly in particular and to that extent can also be installed in an automated way and therefore especially inexpensively.

A problematic aspect of eliminating axial play by such a spring element is that the initial stress of the spring either cannot be varied, or can be varied only with a very great effort.

The initial stress is predetermined essentially by the shape of the leaf-spring like spring element and by its installed position.

It is therefore the object of the invention to refine an electric drive unit, especially for windshield washers of a motor vehicle, of the generic type in question in such a way that it is possible to set the initial stress of the spring element in a very simple way, and especially in conjunction with automated production.

Advantages of the Invention

In an electric drive unit of the typed described at the outset, this object is attained according to the invention in that the spring is a curved bending spring, which has a substantially V-shaped profile, with a tensioning plate secured in the gearbox and with a leg, yielding in the axial direction of the armature shaft, which in the installed state exerts a spring force, on the mushroom-shaped stop face of the armature shaft. The use of a curved bending spring, which has a substantially V-shaped profile, with a tensioning plate secured in the gearbox and with a leg, yielding in the axial direction of the armature shaft, which in the installed state rests, exerting a spring force, on the mushroom-shaped stop face of the armature shaft, has the particularly great advantage that precise setting of the initial stress is made possible along with a very simple assembly of the spring, which can also be done automatically, Since it is known that the spring force is proportional to the spring deflection, the initial stress can be varied by the choice of the corresponding installed position.

The initial stress depends on how markedly the yielding leg is deflected out of its position of repose, in which the spring has a substantially V-shaped profile, toward the fastened tensioning plate.

In order to position and fasten the bending spring at a desired position in a simple way, and in particular also by automated production, it is preferably provided that the tensioning plate has lateral clamping elements, which in a recess provided for the purpose in the gearbox enable on the one hand an axial displacement of the tensioning plate toward the mushroom-shaped stop face and on the other a clamping fastening thereof in any desired position.

The spring constant of the bending spring, that is, its initial stress, is advantageously settable by means of the leg length, leg radius, leg width, leg thickness of the spring, and the axial positioning of the spring in the recess. This makes precise setting of the initial stress possible, along with a fast, unproblematic assembly.

The bending spring is preferably a stamped part and can therefore be made especially economically, including in great numbers.

BRIEF DESCRIPTION OF THE DRAWINGS

Further characteristics and advantages of the invention are the subject of the ensuing description and of the illustrations in the drawing of several exemplary embodiments.

Shown in the brief description of the drawings are:

FIGS. 4a, b, c, d various views of a bending spring for setting the axial play of an armature shaft of the electric drive unit according to the invention shown in FIGS. 1–3.

DESCRIPTION OF THE EXEMPLARY EMBODIMENTS

Figure 1:
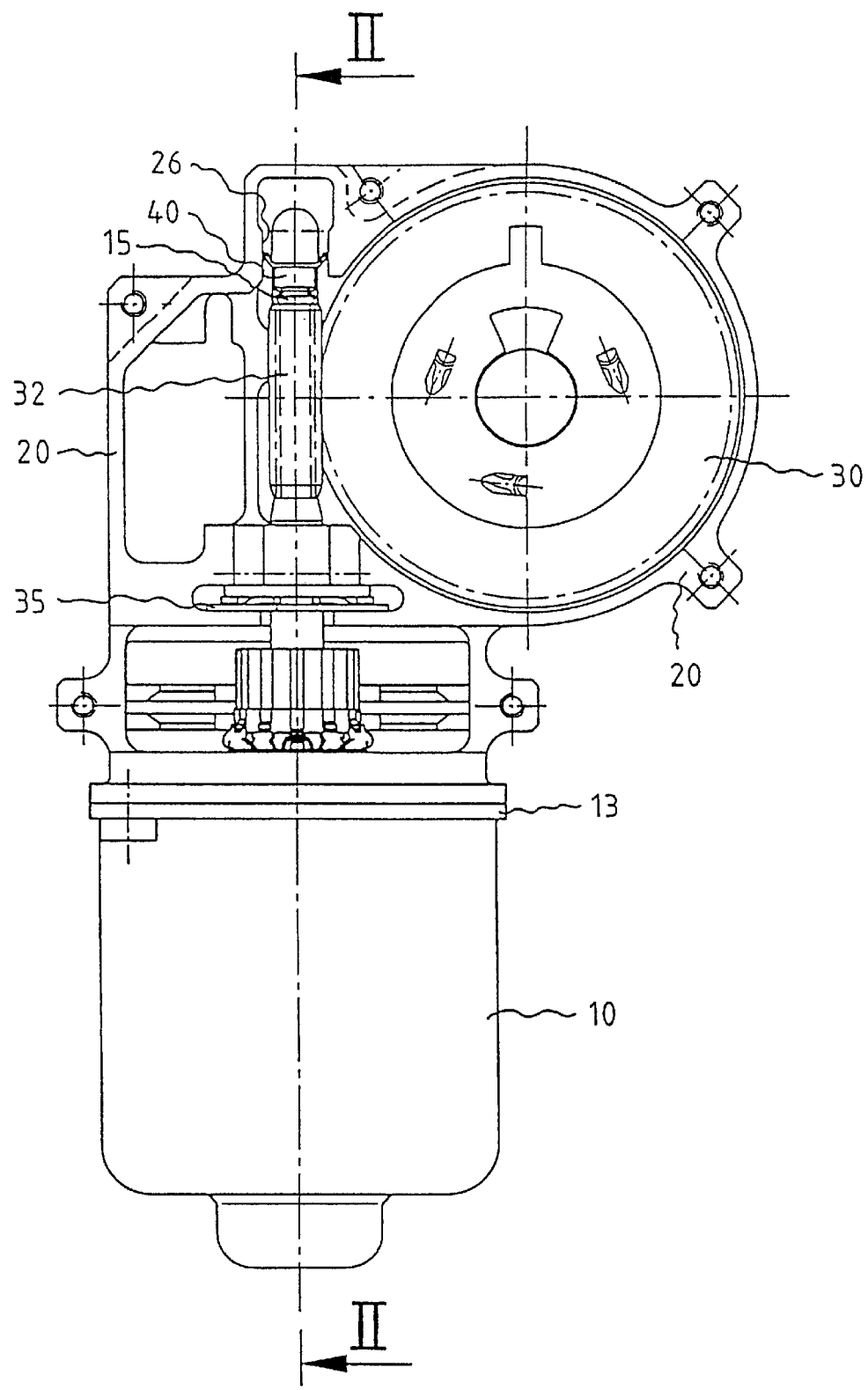
FIG. 1, a schematic plan view of an electric drive unit according to the invention.
Figure 2:
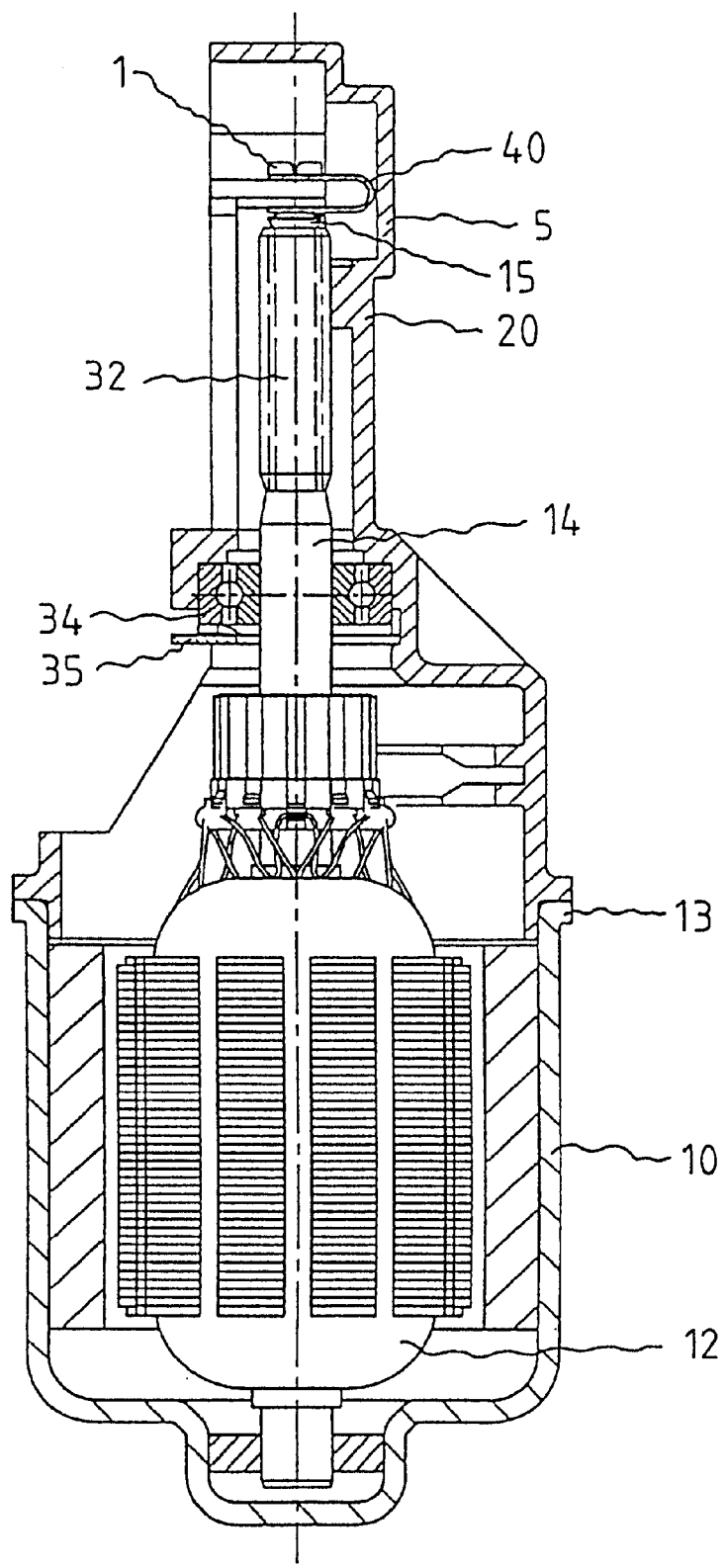
FIG. 2, a schematic side view, partly in section, of the electric drive unit of the invention shown in FIG. 1.

An electric drive unit for windshield washers of a motor vehicle, shown in FIGS. 1 and 2, includes a substantially cup-shaped pole housing 10, in which an armature 12 is accommodated. The armature 12 and the pole housing 10 together form a drive motor.

On its face end, a substantially cup-shaped gearbox 20 is secured to a flange 13 of the pole housing 10 and serves to receive a transmission gear wheel 30, which meshes with a worm 32 connected to an armature shaft 14 of the armature 12. The armature shaft 14, on its face end, has a so-called mushroom-shaped stop face 15, against which a defined initial stress is exerted in the axial direction of the armature shaft 14 by a bendable spring 40. On the side of the worm 32 remote from the mushroom-shaped stop face 15, the armature shaft is supported in a manner known per se in a ball bearing 34, which is axially secured in the gearbox 20 by a retaining bracket 35.

The inner race of ball bearing 34 is secured to the armature shaft.

The bendable spring 40 exerts a defined spring force on an end of the armature shaft 14, as a result of which the axial play in the ball bearing 34, which in such drive units amounts to approximately 0.1 to 0.2 mm, is eliminated. Furthermore, a defined initial stress required for the running properties of the ball bearing 34 is generated by the bendable spring 40.

As seen particularly from FIG. 4, the bendable spring 40 has a substantially V-shaped profile, with a tensioning plate 41 with lateral clamping elements 42, which in a recess 26 provided in the gearbox 30 enables a clamping fastening of the tensioning plate 41, and with a leg 43 that yields in the axial direction of the armature shaft 14 and that in the installed state comes to rest, exerting a spring force, on the mushroom-shaped stop face 15 of the armature shaft 14 (see FIG. 1 and FIG. 2).

The installation of the bendable spring 40 and the setting of the axial play of the armature shaft 14 are done as described below in conjunction with FIG. 3.

First, with the gearbox lid removed, the tensioning plate 41 of the bendable spring 40 is introduced into the recess 26 intended for it in the gearbox 20. To that end, the recess 26, on its side of the armature shaft 14 remote from the mushroom-shaped stop face 15, has a region 26a with an inside diameter that is greater than the spacing of the clamping elements 42 in the uninstalled state.

Figure 3A:
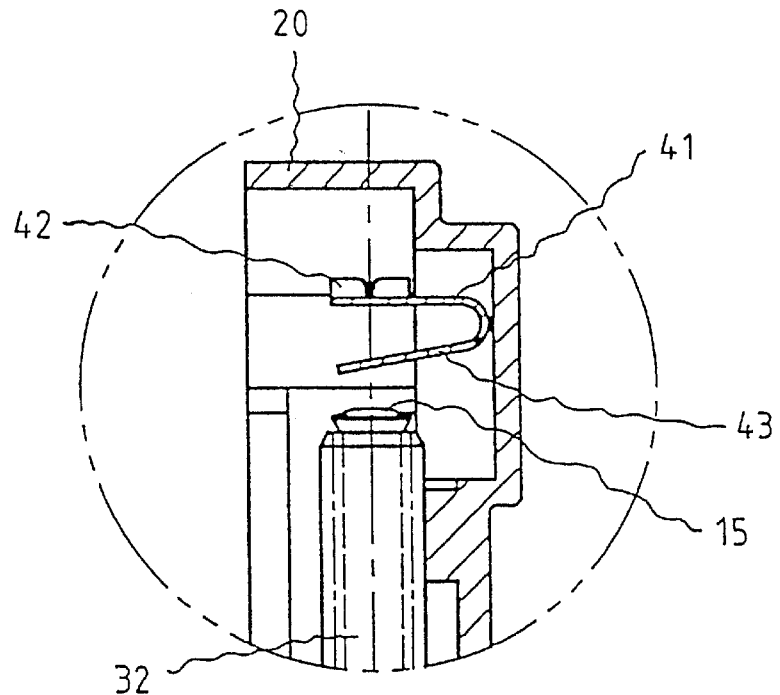
FIG. 3a, a side view, partly in section, of the front part of a drive unit according to the invention, with a bendable spring disposed in it in the preassembled state.
Figure 3B:
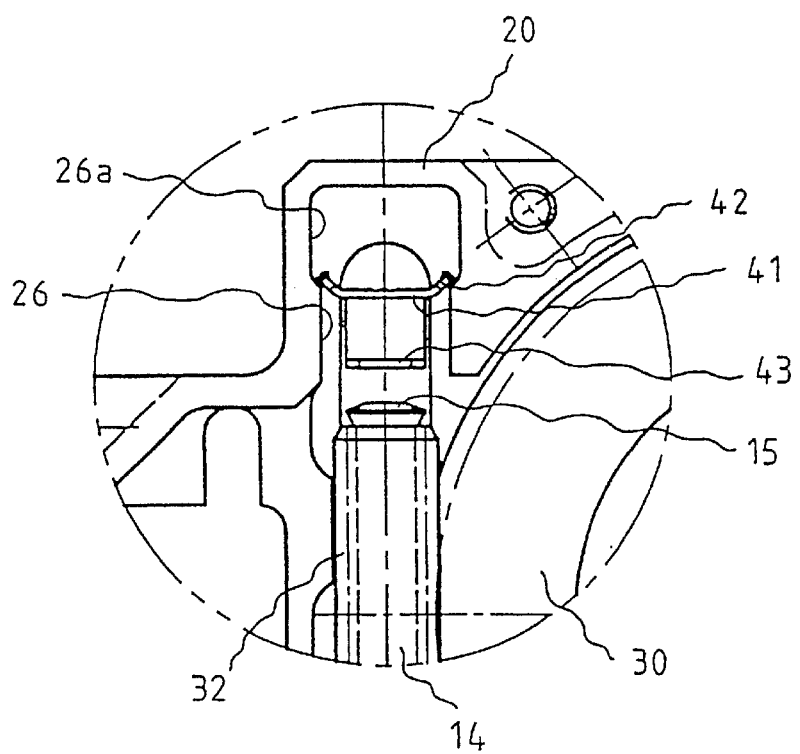
FIG. 3b, a plan view on the front part, shown in FIG. 3a, of an electric drive unit according to the invention.

As seen in FIG. 3a, the yielding leg 43 is bent away at an angle from the tensioning plate 41, so that the bendable spring 40 has a substantially V-shaped profile. To set the longitudinal play of the armature shaft 14, the bendable spring 40 is pushed, by placing a suitable tool against the tensioning plate 41, toward the mushroom-shaped stop face 15 of the armature shaft 14. This pushes the bendable spring 40 so far toward the mushroom-shaped stop face 15 that the yielding leg 43 rests on the mushroom-shaped stop face 15. In the process, the bendable spring is deformed in such a way that in the finally installed state the spring, has a substantially U-shaped profile (see FIG. 1, FIG. 2, and the position shown in dashed lines for the leg 43 in FIGS. 4b and 4c).

In the axial displacement of the bendable spring 40, the clamping elements 42 come to rest on the side walls of the recess 26 in the gearbox 20, the spacing of the clamping elements from one another being less than the spacing of the legs 42 in the uninstalled state of the tensioning plate 41, and the clamping elements thus enable a clamping fastening of the tensioning plate 41 in the recess 26 and at the same time an axial displacement of the tensioning plate 41, and thus of the yielding leg 43 of the bendable spring 40, toward the mushroom-shaped stop face 15. By embodying the pre-stressing means as a bendable spring having the tensioning plate 41, the clamping elements 42, and the yielding leg 43, not only is a simple assembly possible but also a simple, fast setting of the prestressing of the axial play of the armature shaft 14 is possible. Setting the desired initial stress is made possible by the embodiment of the bendable spring 40, that is, its leg length, leg radius, leg width, and leg thickness, and by its axial positioning in the recess 26.

Setting the axial play of the armature shaft 14 and in particular also of the initial stress of the ball bearing 34 can be done with the drive motor 12 turned off, and in particular can also be done in an automated production process.

What is claimed is:

1. An electric drive unit for windshield washers of a motor vehicle, including a drive motor having an armature (12) accommodated in a substantially cup-shaped pole housing (10), a substantially cup-shaped gearbox (20), secured by a face end to the pole housing (10), for receiving at least one transmission gear wheel (30) that meshes with a worm (32) connected to an armature shaft (14) of the armature (12), and the armature shaft (14) has a mushroom-shaped stop face (15) on a face end, against which a bendable spring for generating a defined initial stress comes to rest, the bendable spring is a curved bent spring (40), which has a substantially V-shaped profile formed by a tensioning plate (41) and by a leg (43), that said tensioning plate (41) is secured in the gearbox (20) and that the leg (43) yields in an axial direction of the armature shaft (14), which in the installed state said bendable spring rests, exerting an axial spring force, on the mushroom-shaped stop face (15) of the armature shaft (14).

2. The electric drive unit of claim 1, in which the tensioning plate (41) has lateral clamping elements (42), which in a recess (26) provided for the purpose in the gearbox enable on the one hand an axial displacement of the tensioning plate (41) toward the mushroom-shaped stop face (15) and on the other a clamping fastening thereof in a desired position.

3. The electric drive of claim 1, in which a desired initial stress of the bendable spring (40) can be set by means of a leg length, leg radius, leg width, and leg thickness of the spring, and the axial positioning of the spring in the recess (26).

4. The electric drive unit of claim 1, in which the spring (40) is a stamped part.

5. The electric drive of claim 2, in which a desired initial stress of the bendable spring (40) can be set by means of a leg length, leg radius, leg width, and leg thickness of the spring, and the axial positioning of the spring in the recess (26).

6. The electric drive unit of claim 2, in which the spring (40) is a stamped part.

7. The electric drive unit of claim 3, in which the spring (40) is a stamped part.

8. The electric drive unit of claim 5, in which the spring (40) is a stamped part.

* * * * *